United States Patent [19]

Garrett

[11] Patent Number: 5,407,229

[45] Date of Patent: Apr. 18, 1995

[54] UNIVERSAL APPLICATION CONTOURED SPLASHGUARD

[75] Inventor: Milton Garrett, Shaker Heights, Ohio

[73] Assignee: Highland Group Industries L.P., Solon, Ohio

[21] Appl. No.: 979,583

[22] Filed: Nov. 20, 1992

[51] Int. Cl.[6] .............................................. B62B 9/16
[52] U.S. Cl. .................................. 280/851; D12/185
[58] Field of Search ............ 280/851, 848, 847, 152.3; D12/184, 185

[56] References Cited

U.S. PATENT DOCUMENTS

| 4,264,083 | 4/1981 | Matthew et al. | 280/851 |
| 4,315,634 | 2/1982 | Arenhold | 280/851 |
| 4,629,204 | 12/1986 | Arenhold | 280/851 |
| 4,706,981 | 11/1987 | Dorwart | 280/851 |
| 4,709,938 | 12/1987 | Ward et al. | 280/851 |

Primary Examiner—Richard M. Camby
Attorney, Agent, or Firm—Fay, Sharpe, Beall, Fagan, Minnich & McKee

[57] ABSTRACT

A splashguard capable of being applied to a wide variety of motor vehicles comprises a primary panel, a secondary panel having an area substantially less than the primary panel, and a tertiary panel. The primary panel has an outer edge, an inner edge, a bottom edge, and a top edge. The primary panel also has a forward splash-deflecting surface and an opposite rearward surface, the rearward surface being attachable directly to the wheel arch of a motor vehicle. The primary panel is elastically deformable to conform with the curvature of the wheel arch for a wide variety of motor vehicles. The secondary panel depends from the outer edge and the bottom edge of the primary panel and forms an angle of less than 180° with the forward surface of the primary panel. The secondary panel has a proximal edge connected to the primary panel and a distal edge, the distal edge of the secondary panel lying substantially in a single plane. The tertiary panel depends from the distal edge of the secondary panel. In a second embodiment of the invention, the splashguard lacks a tertiary panel. In a third embodiment, the primary, secondary, and tertiary panels are substantially laterally symmetric.

9 Claims, 5 Drawing Sheets

UNIVERSAL APPLICATION CONTOURED SPLASHGUARD

BACKGROUND OF THE INVENTION

The present invention relates to splashguards for application to the wheel arches of motor vehicles such as automobiles, utility vehicles, and trucks. In particular, the present invention relates to an "after-market" splashguard that is contoured rather than flat and can be applied to a wide variety of vehicles having vastly different wheel arch shapes.

Splashguards have long been used on motor vehicles to control or contain the water, snow, and dirt that is thrown off a vehicle's tires while travelling on the road during inclement weather. Typically, the splashguard is attached to the wheel arch of the vehicle immediately rearward of the tire. The splashguard is intended to prevent, or at least minimize, water, snow, and dirt from being thrown by the tire onto the body of the vehicle.

Manufacturers of motor vehicles increasingly are offering custom-fit splashguards for their vehicles as an original-equipment option. These splashguards often are contoured in appearance, that is, they have a concave forward-facing surface that serves to contain and control the dispersal of water thrown off the adjacent tire. The rearward-facing surface of these original-equipment contoured splashguards often is complementary-shaped, which presents a pleasing appearance.

Many vehicles are sold without original-equipment splashguards, however, and a large demand exists for vehicle splashguards in the "after market." For many years, after-market splashguards were sold primarily for their functional aspects, and they generally took the form of a piece of planar rubber-like material that attached directly to the wheel arch. The flexibility of the flat splashguard enabled a single product to have virtually universal application, as it could be easily deflected to conform to the longitudinal curvature of any particular wheel arch. An example of a simple, flat, conventional after-market splashguard is shown in U.S. Pat. No. 4,264,083, particularly the plain splashguard depicted in FIG. 14 thereof.

As original-equipment contoured splashguards became more popular, there was an increased demand for an after-market product with the structural appearance and functional advantages of a contoured splashguard. One attempt to address this demand is the CONTURA TM splashguard sold by Highland Industries L.P., the assignee of this application. The CONTURA TM splashguard has two separate flanges joined together along a common edge, a first forward flange for attachment to the longitudinally curved wheel arch and a second flange that angles rearwardly from the forward flange and is intended to flexibly conform to the laterally curved surface of the outer vehicle body panel adjacent the wheel arch. The outer surface of this rearward flange extends into the rearward surface of the splashguard.

The disadvantage of an after-market splashguard such as the CONTURA TM is that the manufacturer must tool for, produce, and keep an inventory of a plurality of models to satisfy the market. Motor vehicles display a wide variance in the lateral curvature of their body panels adjacent their wheel arches. Indeed, although most vehicles have a laterally convex surface adjacent the wheel arches, vehicles with so-called "ground effects" rocker panels are laterally concave. It thus is impossible to provide a single model of a contoured splashguard with a rearward flange that will conform to the body panels on all vehicles.

The present invention is intended to solve this problem by providing a universal-application contoured splashguard.

Additional features and advantages of the present invention will be set forth in part in the description that follows, and in part will be obvious from that description or can be learned by practice of the invention. The advantages of the invention can be realized and obtained by the apparatus particularly pointed out in the appended claims.

SUMMARY OF THE INVENTION

To overcome the shortcomings of the prior art after-market splashguards, and in accordance with the purpose of the invention, as embodied and broadly described herein, the splashguard of this invention, which is applicable to the wheel arches of a wide variety of motor vehicles, comprises a primary panel and a secondary panel having an area substantially less than the primary panel. The primary panel has an inner edge, an outer edge, and a bottom edge, and further has a forward splash-deflecting surface and an opposite rearward surface. The rearward surface is attachable directly to the wheel arch and the primary panel is elastically deformable to conform with the curvature of the wheel arch for a wide variety of motor vehicles. The secondary panel depends from the outer and bottom edges of the primary panel and forms an angle with the forward surface of the primary panel.

Preferably, the secondary panel has a proximal edge connected to the primary panel and a distal edge, and the distal edge of the secondary panel lies substantially in a single plane. In a more specific embodiment, the splashguard of this invention also includes a tertiary panel depending from the distal edge of the secondary panel.

In an additional embodiment, the splashguard of this invention comprises a primary panel, a secondary panel having an area substantially less than the primary panel, and a tertiary panel. The primary panel has two side edges and a bottom edge, and further has a forward splash-deflecting surface and an opposite rearward surface, the rearward surface being attachable directly to the wheel arch. The primary panel is elastically deformable to conform with the curvature of the wheel arch for a wide variety of motor vehicles. The secondary panel depends from the side edges and the bottom edge of the primary panel and forms an angle of less than 180° with the forward surface of the primary panel. The secondary panel has a proximal edge connected to the primary panel and a distal edge, the distal edge of the secondary panel lying substantially in a single plane. The tertiary panel depends from the distal edge of the secondary panel. Preferably, the primary, secondary, and tertiary panels are substantially laterally symmetric with respect to a centerline located between and equidistant from the side edges of the primary panel.

The accompanying drawings, which are incorporated in and which constitute a part of this specification, illustrate at least one embodiment of the invention and, together with the description, explain the principles of the invention.

DESCRIPTION OF THE PREFERRED EMBODIMENTS

Reference now will be made in detail to the presently preferred embodiments of the invention, examples of which are illustrated in the accompanying drawings.

Figures 1, 2:
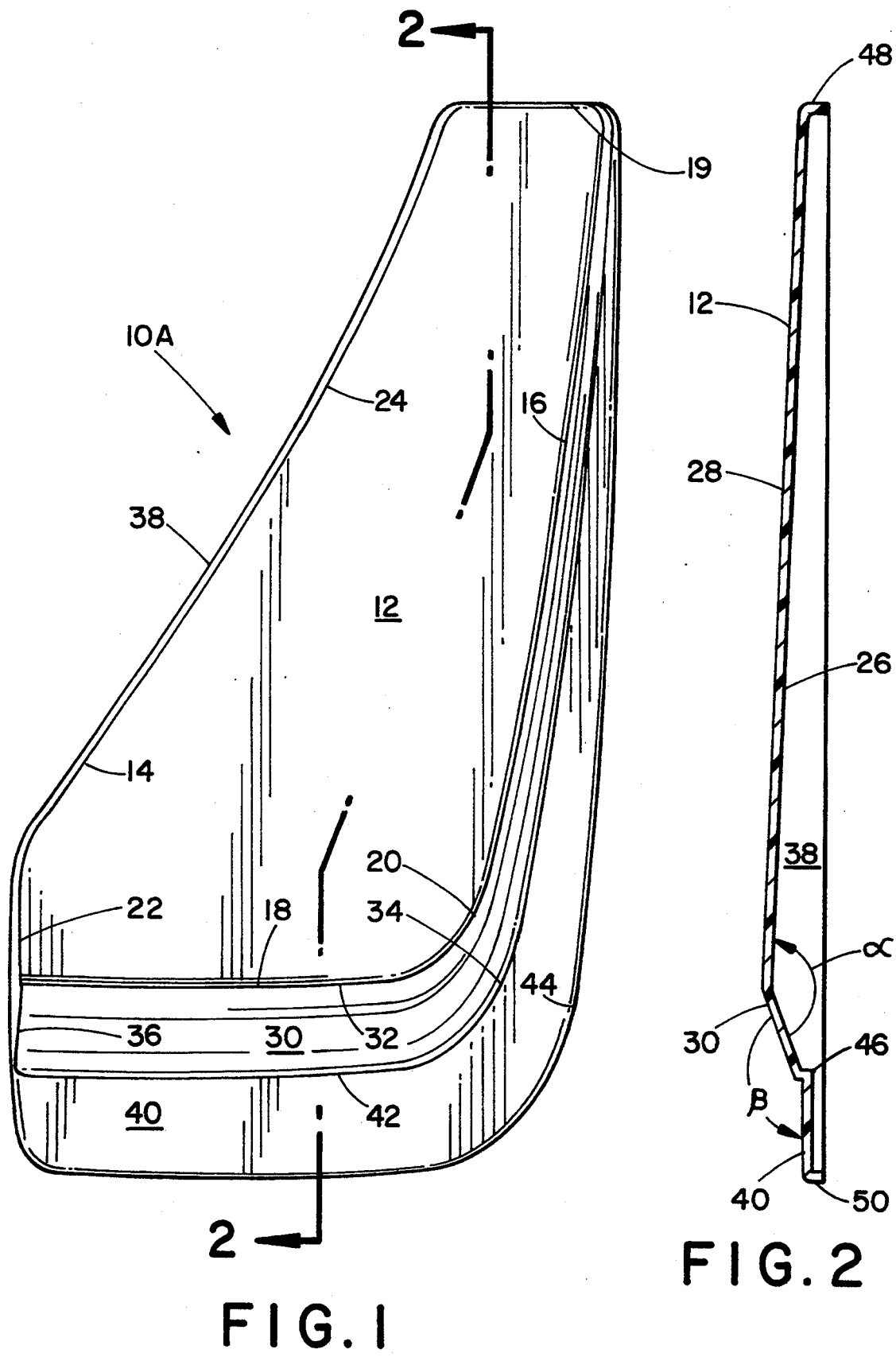
FIG. 1 is an elevational view of the rearward-facing surface of a right-hand-side example of one embodiment of the splashguard of the present invention.
FIG. 2 is a vertical cross-sectional view taken along line 2—2 of FIG. 1.
Figure 3:
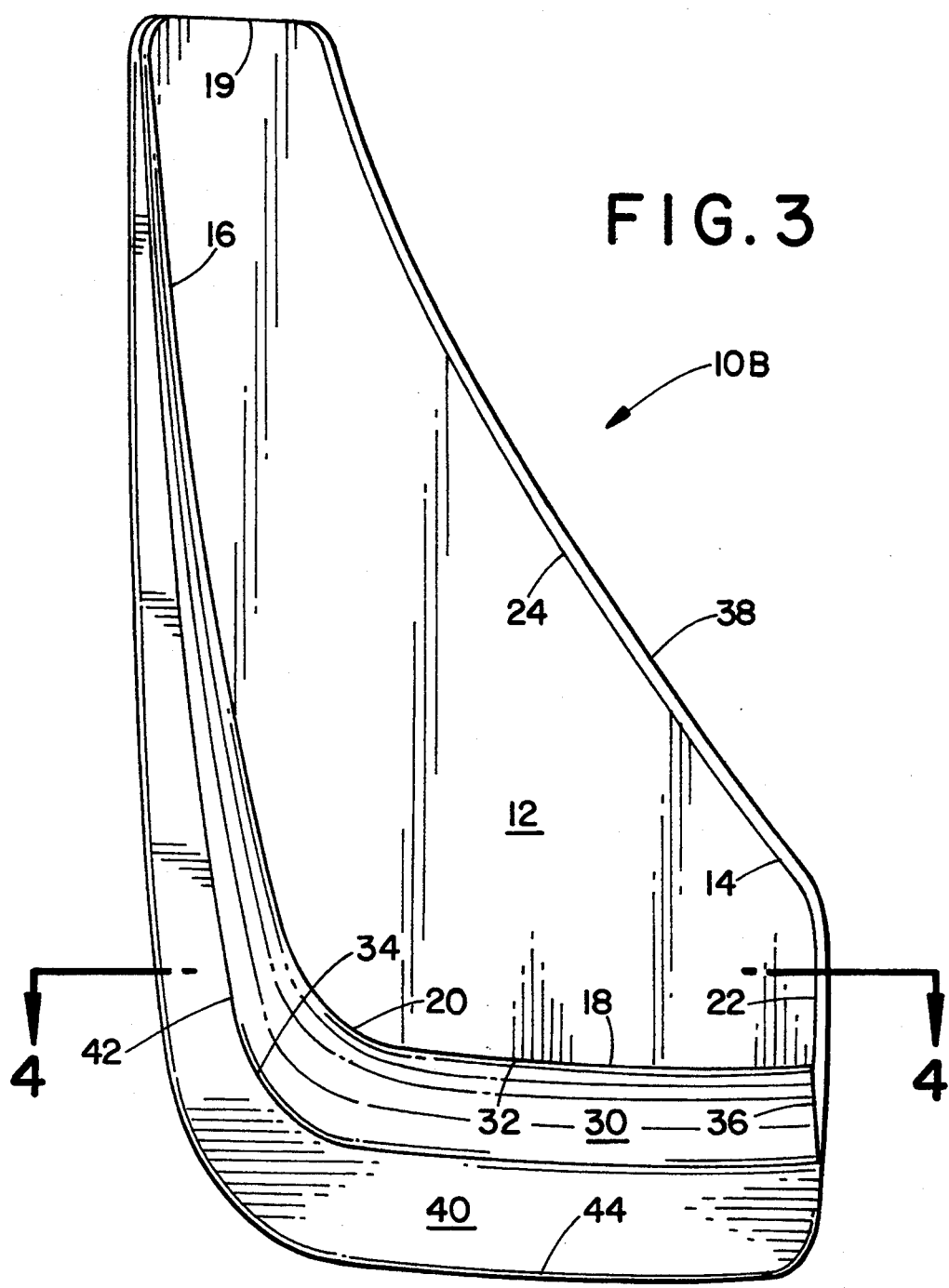
FIG. 3 is an elevational view of the rearward-facing surface of a left-hand-side example of the first embodiment of the splashguard of the present invention.
Figure 4:
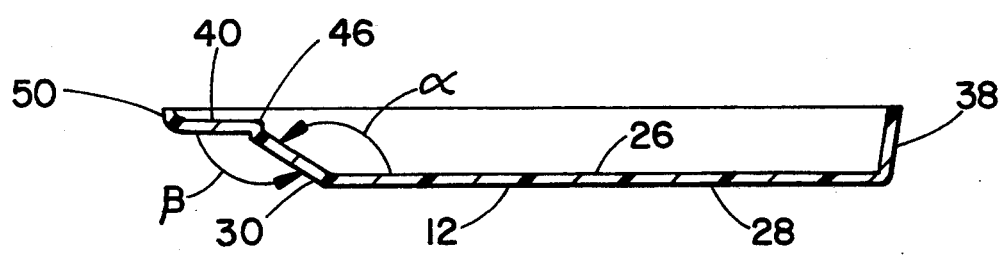
FIG. 4 is a horizontal cross-sectional view taken along line 4—4 of FIG. 3.
Figures 5, 6:
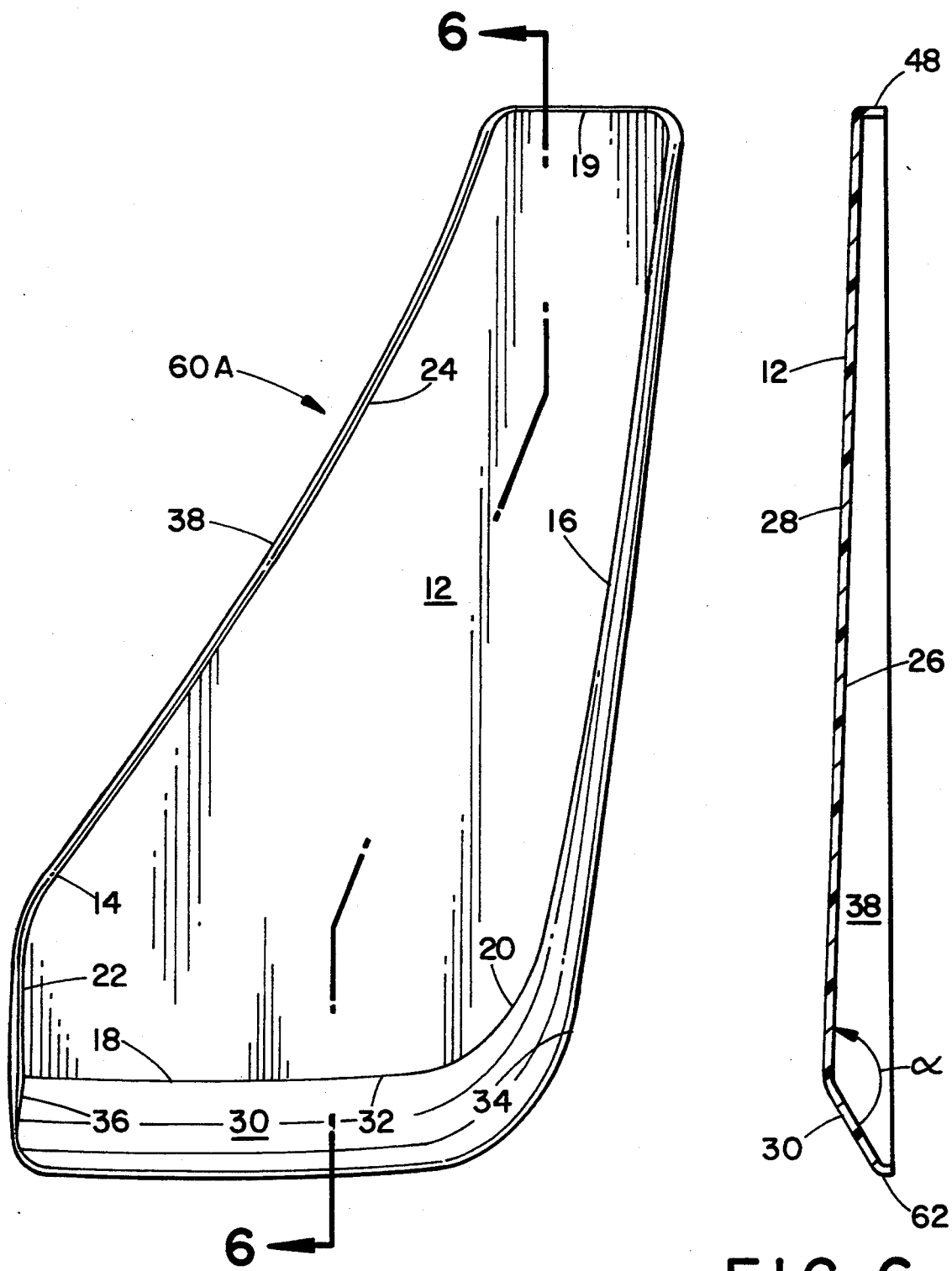
FIG. 5 is an elevational view of the rearward-facing surface of a right-hand-side example of a second embodiment of the splashguard of the present invention.
FIG. 6 is a vertical cross-sectional view taken along line 6—6 of FIG. 5.
Figure 7:
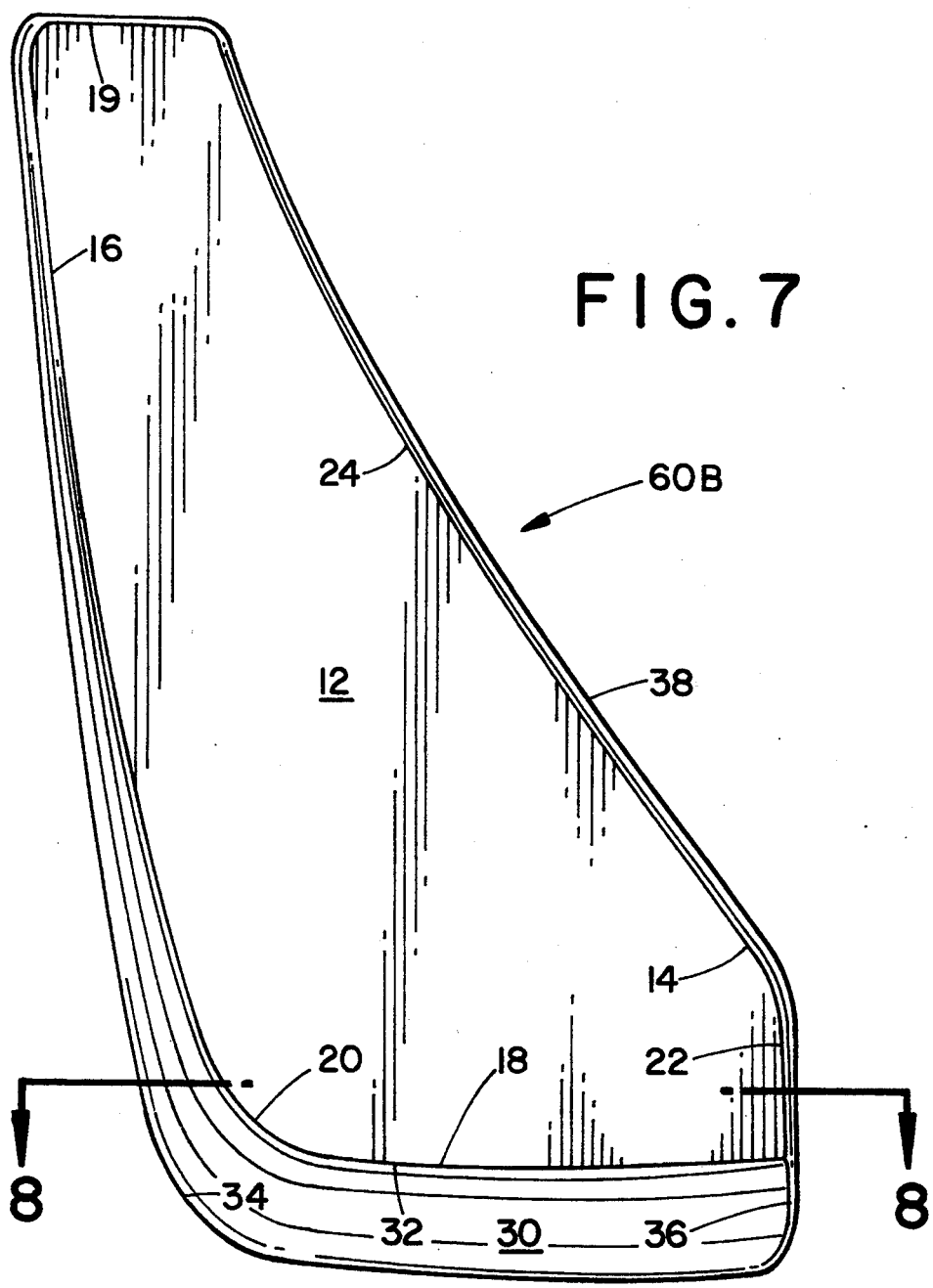
FIG. 7 is an elevational view of the rearward-facing surface of a left-hand-side example of the second embodiment of the splashguard of the present invention.
Figure 8:
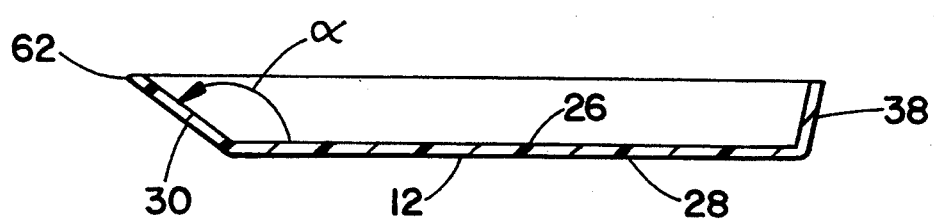
FIG. 8 is a horizontal cross-sectional view taken along line 8—8 of FIG. 7.

One embodiment of the present invention is shown in FIGS. 1-4 of the drawings. FIGS. 1 and 2 are, respectively, an elevational view and a vertical cross-sectional view of a right-hand-side splashguard 10A constructed in accordance with the present invention. FIGS. 3 and 4 are, respectively, an elevational view and a horizontal cross-sectional view of a left-hand-side splashguard 10B in accordance with the present invention. As those of ordinary skill in the art will appreciate that splashguards 10A and 10B are mirror-image duplicates of one another, the first embodiment of this invention will be referenced in the singular as splashguard 10.

With continued reference to FIGS. 1-4, the first embodiment of the splashguard of this invention includes primary panel 12, which has an inner edge 14, an outer edge 16, a bottom edge 18, and a top edge 19. As shown in FIGS. 1 and 3, outer edge 16 and bottom edge 18 of primary panel 12 preferably are connected by a curved transitional edge portion 20.

In order to ensure clearance between splashguard 10 and suspension parts housed within the wheel arch of a motor vehicle to which splashguard 10 is to be applied (and to minimize material cost), the width of primary panel 12 decreases between bottom edge 18 and top edge 19. In the embodiment shown in FIGS. 1 and 3, this decrease in width is provided by making inner edge 14 a combination of a vertical edge portion 22 adjacent bottom edge 18 and a diagonal edge portion 24. Diagonal edge portion 24 preferably is also slightly curved to approximate the lateral curvature of a motor vehicle wheel arch.

Primary panel 12 has a splash-deflecting surface 26, which faces forward on the motor vehicle when mounted in its intended position behind a vehicle tire. Primary panel 12 also includes a rearward surface 28 opposite forward splash-deflecting surface 26. Rearward surface 28 is attachable directly to the wheel arch of the motor vehicle by conventional splashguard attaching means, such as sheet-metal screws that preferably extend through primary panel 12 and into the wheel arch. The attachment of primary panel 12 to the wheel arch of the motor vehicle preferably is adjacent diagonal edge portion 24. Primary panel 12 should be formed of a flexible material so that it is elastically deformable to conform with the longitudinal curvature of the wheel arch, thus permitting application of the splashguard to a wide variety of motor vehicles. Materials such as polyethylene, polyvinyl chloride, thermoplastic olefin, and rubber-like thermoplastic compounds can be used.

In accordance with the invention, splashguard 10 also includes a secondary panel 30 having an area substantially less than that of primary panel 12. Secondary panel 30 depends from outer edge 16 and bottom edge 18 of primary panel 12. Secondary panel 30 has a forward-facing surface that forms an angle $\alpha$ (see FIGS. 2 and 4) that is less than 180° with respect to forward surface 26 of primary panel 12. The angle between secondary panel 30 and primary panel 12 provides the desired contouring for splashguard 10.

Secondary panel 30 has a proximal edge 32 connected to primary panel 12 and a distal edge 34. In the preferred embodiment shown in FIGS. 1 and 3, proximal edge 32 of secondary panel 30 is curved to conform with the curved edge formed by outer edge 16, bottom edge 18, and curved transitional edge portion 20 of primary panel 12. Distal edge 34 of secondary panel 30 preferably lies substantially in a single plane.

Secondary panel 30 terminates in the lateral direction at inner terminal edge 36. In the embodiment of the invention shown in FIGS. 1-4, an inner edge panel 38 depends from inner terminal edge 36 of secondary panel 30 and from inner edge 14 of primary panel 12. In the presently preferred embodiment of the invention, inner edge panel 38 is generally perpendicular to primary panel 12 and is provided primarily to facilitate the tooling for the manufacture of splashguard 10. As shown in the cross-sectional views of FIGS. 2 and 4, the forward-facing extreme edges of splashguard 10 are substantially within a single plane, which facilitates setting the depth of the tooling surfaces forming the splashguard.

It will be apparent to one of ordinary skill in the art that inner edge panel 38 increases the stiffness of splashguard 10. Consequently, the depth of inner edge panel 38 should not be so great as to prevent primary panel 12 from elastically deforming to conform with the longitudinal curvature of the wheel arch to which the splashguard is to be applied. It will also be apparent to one of ordinary skill in the art that inner edge panel 38 can be eliminated all together to ensure that primary panel 12 will be sufficiently flexible to conform to the wheel arch during application. Elimination of inner edge panel 38 also would facilitate the use of conventional S-shaped spring clips or the like for mounting splashguard 10 on a vehicle wheel arch.

The embodiment of the invention shown in FIGS. 1-4 also includes a tertiary panel 40 depending from distal edge 34 of secondary panel 30. Tertiary panel 40 is oriented such that its rearward-facing surface forms an angle $\beta$ (see FIGS. 2 and 4) of less than 180° with the rearward-facing surface of secondary panel 30. Tertiary panel 40 includes a curved proximal edge 42 connected to secondary panel 30 and a curved distal edge 44. Distal edge 44 of tertiary panel 40 preferably lies substantially in a single plane.

As shown in FIGS. 2 and 4, the connection between secondary panel 30 and tertiary panel 40 preferably is provided by a transitional step 46. Step 46 facilitates two-tone coloration of splashguard 10, which often is desirable for ornamental reasons. As an example, the entire splashguard 10 can be vacuum-formed or injection molded with a black-pigmented thermoplastic olefin material. The rearward-facing surfaces of primary panel 12 and secondary panel 30 then can be painted a color that matches that of the adjacent motor vehicle body panels, while retaining the black coloration of tertiary panel 40. Step 46 facilitates the masking of tertiary panel 40 during the painting operation. Of course, one of ordinary skill in the art will appreciate that the step between panels 12 and 30 can be eliminated and other transitional configurations can be employed without departing from the scope and intent of the present invention.

As shown in FIGS. 2 and 4, top edge 19 of primary panel 12 preferably terminates in a forward-extending lip 48, and distal edge 44 of tertiary panel 40 terminates in a forward-extending lip 50, with the extreme edges of lips 48 and 50 and the extreme edge of inner edge panel 38 being substantially coplanar when splashguard 10 is in its unmounted, relaxed state.

A second embodiment of the present invention is depicted in FIGS. 5–8, which show right-hand-side splashguard 60A and left-hand-side splashguard 60B (referenced in the singular as splashguard 60). Splashguard 60 essentially is equivalent to splashguard 10 shown in FIGS. 1–4, except that splashguard 60 lacks tertiary panel 40. Accordingly, the description above with respect to the embodiment shown in FIGS. 1–4 holds equally well for the second embodiment of the invention shown in FIGS. 5–8, to the extent that the same reference numerals are employed in the figures. Because splashguard 60 lacks tertiary panel 40, it also lacks transitional step 46. In the place of transitional step 46, distal edge 34 of secondary panel 30 for splashguard 60 terminates with a forward-extending lip 62, the extreme edge of which is coplanar with the extreme edges of lip 48 and inner edge panel 38.

Figures 9, 10:
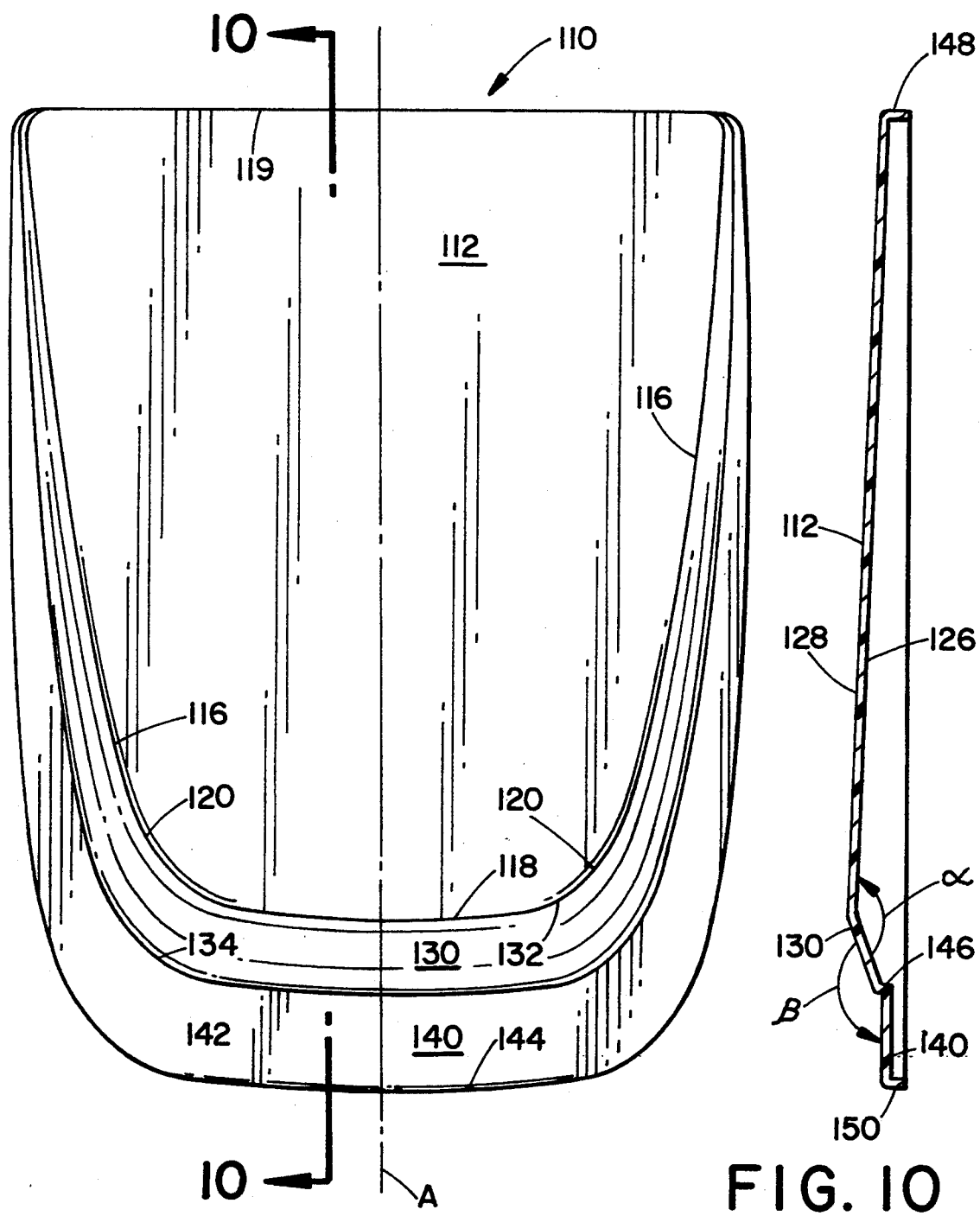
FIG. 9 is an elevational view of the rearward-facing surface of a third embodiment of the splashguard of the present invention.
FIG. 10 is a vertical cross-sectional view taken along line 10—10 of FIG. 9.

A third embodiment of the present invention is shown in FIGS. 9 and 10 of the drawings, which are, respectively, an elevational view and a vertical cross-sectional view of a splashguard 110 constructed in accordance with the present invention and applicable to either side of a motor vehicle. The configuration of splashguard 110 has particular applicability to trucks.

With continued reference to FIGS. 9 and 10, the third embodiment of the splashguard of this invention includes primary panel 112, which has two side edges 116 (the structural equivalents of edges 14 and 16 in the previous embodiments), a bottom edge 118, and a top edge 119. As shown in FIG. 9, side edges 116 and bottom edge 118 of primary panel 112 preferably are connected by curved transitional edge portions 120.

Primary panel 112 has a splash-deflecting surface 126, which faces forward on the motor vehicle when mounted in its intended position behind a vehicle tire. Primary panel 112 also includes a rearward surface 128 opposite forward splash-deflecting surface 126. Rearward surface 128 is attachable directly to the wheel arch of the motor vehicle by conventional splashguard attaching means.

In accordance with the invention, splashguard 110 also includes a Secondary panel 130 having an area substantially less than that of primary panel 112. Secondary panel 130 depends from side edges 116 and bottom edge 118 of primary panel 112 and forms an angle $\alpha$ that is less than 180° with respect to forward surface 126 of primary panel 112. Secondary panel 130 has a proximal edge 132 connected to primary panel 112 and a distal edge 134. As shown in FIG. 9, secondary panel 130, proximal edge 132, and distal edge 134 are substantially U-shaped to conform to the curvature of the side and bottom edges of primary panel 112. Distal edge 134 of secondary panel 130 preferably lies substantially in a single plane.

The embodiment of the invention shown in FIGS. 9 and 10 also includes a U-shaped tertiary panel 140 depending from distal edge 134 of secondary panel 130. Tertiary panel 140 is oriented such that its rearward-facing surface forms an angle $\beta$ of less than 180° with the rearward-facing surface of secondary panel 130. Tertiary panel 140 includes a curved proximal edge 142 connected to secondary panel 130 and a curved distal edge 144. Distal edge 144 of tertiary panel 140 preferably lies substantially in a single plane.

As shown in FIG. 10, the connection between secondary panel 130 and tertiary panel 140 preferably is provided by a transitional step 146. In addition, top edge 119 of primary panel 112 preferably terminates in a forward-extending lip 148, and distal edge 144 of tertiary panel 140 terminates in a forward-extending lip 150, with the extreme edges of lips 148 and 150 being substantially coplanar.

Splashguard 110 preferably is laterally symmetric with respect to centerline A shown in FIG. 9. Centerline A is located between and equidistant from side edges 116 of primary panel 112. The symmetric construction of splashguard 110 enables it to be mounted on either the right-hand or left-hand side of a vehicle.

It will be apparent to those skilled in the art that other modifications and variations can be made in the invention without departing from the scope of the invention. For example, the splashguard of this invention can be formed of materials other than those recited above and can be manufactured by methods other than vacuum-forming and injection molding. The invention in its broader aspects is, therefore, not limited to the specific details and illustrated examples shown and described. Accordingly, it is intended that the present invention cover such modifications and variations provided that they fall within the scope of the appended claims and their equivalents.

What is claimed is:

1. A splashguard for application to a wheel arch of a wide variety of motor vehicles, comprising:
   a. a primary panel having an inner edge, an outer edge, and a bottom edge, said primary panel further having a forward splash-deflecting surface and an opposite rearward surface, said rearward surface being attachable directly to the wheel arch and said primary panel being elastically deformable to conform with the curvature of the wheel arch for a wide variety of motor vehicles;
   b. a secondary panel having an area substantially less than said primary panel, said secondary panel depending from said outer and bottom edges of said primary panel, and said secondary panel having opposed forward and rearward surfaces, said forward surface of said secondary panel forming an angle of less than 180° with said forward surface of said primary panel, said secondary panel also having a proximal edge connected to said primary panel and a distal edge; and c. a tertiary panel depending from said distal edge of said secondary panel and having opposed forward and rearward surfaces, said rearward surface of said tertiary panel forming an angle of less than 180° with said rearward surface of said secondary panel.

2. The splashguard of claim 1, wherein said distal edge of said secondary panel lies substantially in a single plane.

3. The splashguard of claim 1, wherein said outer edge and said bottom edge of said primary panel are connected by a curved transitional edge portion.

4. The splashguard of claim 3, wherein said secondary panel has a curved proximal edge connected to said primary panel and a curved distal edge.

5. The splashguard of claim 4, wherein said tertiary panel has a curved proximal edge connected to said secondary panel and a curved distal edge.

6. The splashguard of claim 5, wherein said distal edge of said tertiary panel lies substantially in a single plane.

7. A splashguard for application to a wheel arch of a wide variety of motor vehicles, comprising:

a. a primary panel having two side edges and a bottom edge, said primary panel further having a forward splash-deflecting surface and an opposite rearward surface, said rearward surface being attachable directly to the wheel arch and said primary panel being elastically deformable to conform with the curvature of the wheel arch for a wide variety of motor vehicles;

b. a secondary panel having an area substantially less than said primary panel, said secondary panel depending from said side edges and said bottom edge of said primary panel, and said secondary panel having opposed forward and rearward surfaces, said forward surface of said secondary panel forming an angle of less than 180° with said forward surface of said primary panel, said secondary panel having a proximal edge connected to said primary panel and a distal edge; and c. a tertiary panel depending from said distal edge of said secondary panel and having opposed forward and rearward surfaces, said rearward surface of said tertiary panel forming an angle of less than 180° with said rearward surface of said secondary panel.

8. The splashguard of claim 7, wherein said distal edge of said secondary panel lies substantially in a single plane.

9. The splashguard of claim 7, wherein each of said primary, secondary, and tertiary panels are substantially laterally symmetric with respect to a centerline located between and equidistant from said side edges of said primary panel.

* * * * *